(12) United States Patent
Wilhelmsson et al.

(10) Patent No.: US 7,480,342 B2
(45) Date of Patent: Jan. 20, 2009

(54) SOFT VALUE CALCULATION FOR MULTILEVEL SIGNALS

(75) Inventors: Leif Wilhelmsson, Dalby (SE); Peter Malm, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 577 days.

(21) Appl. No.: 10/506,913

(22) PCT Filed: Feb. 26, 2003

(86) PCT No.: PCT/EP03/01945

§ 371 (c)(1),
(2), (4) Date: Apr. 26, 2005

(87) PCT Pub. No.: WO03/075528

PCT Pub. Date: Sep. 12, 2003

(65) Prior Publication Data

US 2005/0201484 A1    Sep. 15, 2005

Related U.S. Application Data

(60) Provisional application No. 60/363,415, filed on Mar. 12, 2002.

(30) Foreign Application Priority Data

Mar. 7, 2002   (EP) .................................. 02388019

(51) Int. Cl.
*H04L 25/34*   (2006.01)

(52) U.S. Cl. .................. 375/286; 375/262; 375/264; 714/794; 714/795; 714/780; 714/781

(58) Field of Classification Search .............. 375/286, 375/262, 264, 265, 340, 341; 714/780, 781, 714/795, 794
See application file for complete search history.

(56) References Cited

U.S. PATENT DOCUMENTS

| 5,657,354 | A | 8/1997 | Thesling, III et al. |
| 6,499,128 | B1 * | 12/2002 | Gerlach et al. ............. 714/755 |
| 6,977,972 | B1 * | 12/2005 | Kandala et al. ............. 375/332 |

FOREIGN PATENT DOCUMENTS

| DE | 199 12 825 C 1 | 8/2000 |
| WO | WO 00/44141 | 7/2000 |

OTHER PUBLICATIONS

Andrew J. Viterbi, "An Intuitive Justification and a Simplified Implementation of the MAP Decoder for Convolutional Codes", IEEE Journal On Selected Areas In Communications, vol. 16, No. 2, Feb. 1998, pp. 260-264.

(Continued)

*Primary Examiner*—David C Payne
*Assistant Examiner*—Rahel Guarino
(74) *Attorney, Agent, or Firm*—Michael Cameron (57) ABSTRACT

A sub-optimal method is disclosed for calculating the reliability values (soft values) for the bits of a multilevel signal. The log-likelihood values are approximated using only the dominant terms, so called max-log approximation, that is for each bit position only the two closest signal symbols of opposite bit value ($S_8$, $S_6$) are considered in the sum. The used modulation scheme is 16-QAM together with Gray-labelling. Two versions of approximation are proposed: one version consists of using the two distances between the received value and the two closest symbols of opposite bit value ($\delta_1$ $\delta_2$). In order to simplify and speed up the calculation, the second version consists of using the distance between the two closest symbols ($\delta_3$) to approximate the distance between the second closest symbol and the received value. Furthermore, precalculated results are stored in look-up tables to speed up the calculation.

25 Claims, 6 Drawing Sheets

OTHER PUBLICATIONS

Günter Hellstern; "Coded Modulation with Feedback Decoding Trellis Codes"; Proceedings of the International Conference on Communications, IEEE, vol. 2, May 23, 1993; pp. 1071-1075.

Michael Speth et al; "Low Complexity Space-Frequency MLSE for Multi-user COFDM"; Global Telecommunications Conference—Globecom '99; IEEE, vol. 5, Dec. 5, 1999, pp. 2395-2399.

K. Fagervik et al.; "Low Complexity Bit By Bit Soft Output Demodulator"; Electronics Letters; vol. 32, No. 11, May 23, 1996. pp. 985-987.

* cited by examiner

| Decision region | $L_1$ | $L_2$ | $L_3$ | $L_4$ |
|---|---|---|---|---|
| $S_1$ | $4K \cdot (2ad-2d^2)$ | $4K \cdot (-2bd+2d^2)$ | $4K \cdot (ad-2d^2)$ | $4K \cdot (bd-2d^2)$ |
| $S_2$ | $4K \cdot (ad)$ | $4K \cdot (-2bd+2d^2)$ | $4K \cdot (ad-2d^2)$ | $4K \cdot (bd-2d^2)$ |
| $S_3$ | $4K \cdot (-ad)$ | $4K \cdot (-2bd+2d^2)$ | $4K \cdot (ad-2d^2)$ | $4K \cdot (bd-2d^2)$ |
| $S_4$ | $4K \cdot (-2ad+2d^2)$ | $4K \cdot (-2bd+2d^2)$ | $4K \cdot (ad-2d^2)$ | $4K \cdot (bd-2d^2)$ |
| $S_5$ | $4K \cdot (2ad-2d^2)$ | $4K \cdot (-bd)$ | $4K \cdot (ad-2d^2)$ | $4K \cdot (bd-2d^2)$ |
| $S_6$ | $4K \cdot (ad)$ | $4K \cdot (-bd)$ | $4K \cdot (ad-2d^2)$ | $4K \cdot (bd-2d^2)$ |
| $S_7$ | $4K \cdot (-ad)$ | $4K \cdot (-bd)$ | $4K \cdot (ad-2d^2)$ | $4K \cdot (bd-2d^2)$ |
| $S_8$ | $4K \cdot (-2ad+2d^2)$ | $4K \cdot (-bd)$ | $4K \cdot (ad-2d^2)$ | $4K \cdot (bd-2d^2)$ |
| $S_9$ | $4K \cdot (2ad-2d^2)$ | $4K \cdot (-bd)$ | $4K \cdot (ad-2d^2)$ | $4K \cdot (bd-2d^2)$ |
| $S_{10}$ | $4K \cdot (ad)$ | $4K \cdot (-bd)$ | $4K \cdot (ad-2d^2)$ | $4K \cdot (bd-2d^2)$ |
| $S_{11}$ | $4K \cdot (-ad)$ | $4K \cdot (-bd)$ | $4K \cdot (ad-2d^2)$ | $4K \cdot (bd-2d^2)$ |
| $S_{12}$ | $4K \cdot (-2ad+2d^2)$ | $4K \cdot (-bd)$ | $4K \cdot (ad-2d^2)$ | $4K \cdot (bd-2d^2)$ |
| $S_{13}$ | $4K \cdot (2ad-2d^2)$ | $4K \cdot (2bd-2d^2)$ | $4K \cdot (ad-2d^2)$ | $4K \cdot (bd-2d^2)$ |
| $S_{14}$ | $4K \cdot (ad)$ | $4K \cdot (2bd-2d^2)$ | $4K \cdot (ad-2d^2)$ | $4K \cdot (bd-2d^2)$ |
| $S_{15}$ | $4K \cdot (-ad)$ | $4K \cdot (2bd-2d^2)$ | $4K \cdot (ad-2d^2)$ | $4K \cdot (bd-2d^2)$ |
| $S_{16}$ | $4K \cdot (-2ad+2d^2)$ | $4K \cdot (2bd-2d^2)$ | $4K \cdot (ad-2d^2)$ | $4K \cdot (bd-2d^2)$ |

SOFT VALUE CALCULATION FOR MULTILEVEL SIGNALS

CROSS REFERENCE TO RELATED APPLICATIONS

The present application claims priority to, and incorporates by reference in its entirety, U.S. Provisional Application Ser. No. 60/363,415 filed Mar. 12, 2002.

This invention relates to digital communications systems and, more particularly, the generation of soft reliability values for multilevel signals.

Within the field of digital communications, multilevel modulation is used to map a number of bit sequences to a signal alphabet comprising a number of signal symbols, i.e. a number of points in signal space. For example, a bit sequence may be mapped onto a point in a complex signal space. A signal alphabet of size M allows $\log_2(M)$ bits to be mapped to each symbol. However, when symbols are received at a receiver, they may be affected by noise, thereby affecting the decoding of the signal when retrieving the transmitted bit sequence. If multilevel modulation is used in conjunction with channel coding, many channel decoders, such as iterative decoders based on the BCJR algorithm, require so-called soft bit values as an input. A soft bit value corresponds to a reliability value of a single bit being 0 or 1.

Examples of multilevel modulation include multi-amplitude level modulation in Pulse Amplitude Modulation (PAM), multi phase level modulation in Phase Shift Keying (PSK), multi signal point modulation in Quadrature Amplitude Modulation (QAM).

For example, an emerging technology for wideband digital radio communications of Internet, multimedia, video and other capacity-demanding applications in connection with the third generation of mobile telephone systems is the evolving Wideband Code Division Multiple Access (WCDMA) specified as part of the 3GPP standardisation organisation. Within this technology, High Speed Downlink Packet Access (HSDPA) is provided including a high speed downlink shared channel (HS-DSCH) which uses 16QAM. In 16QAM for example, M=16, i.e. each symbol in the signal alphabet represents 4 bits. Future releases may comprise even larger constellation sizes such as 64 QAM.

It is known how to convert signal symbols to soft bit values by calculating all distances in signal space between the received symbol and all signal points of the signal alphabet. In particular, in order to obtain optimal performance, a likelihood ratio is calculated depending on corresponding sums of probabilities where the probabilities are functions of the calculated distances. It is further known that in the calculation of a likelihood ratio the sums of probabilities may be approximated by the dominant contributions to the sums of probabilities in the likelihood ratio (A. J. Viterbi, "An intuitive justification and a simplified implementation of the MAP decoder for conventional codes", IEEE Journal on selected areas in communications, 16(2), Feb. 1998).

Even though this approximation significantly reduces the computational complexity while only causing a negligible loss in performance, a calculation of all distances to all the signal points is still required in order to determine which two are actually needed for the calculation of the likelihood ratio. For example, in a 16QAM modulation, 16 distances have to be calculated for each received symbol. In particular, if a high rate of symbols needs to be decoded, e.g. several hundred symbols per millisecond, the above performance issue is particularly severe.

German patent no. DE 199 12 825 describes a method of receiving a data symbol in which the closest constellation point of a corresponding 8-PSK multi-symbol constellation is identified for a received data symbol. Subsequently, for each bit position, the symbol having a different value at that position and which is closest to the Identified constellation point is looked up from a look-up table. A soft value is calculated as the difference of the distances from the received symbol to the two identified constellation points. Hence, the number of distance calculations is reduced.

It is an object of the invention to provide a method of generating a reliability value that reduces the computational complexity.

The above and other problems are solved when a method of generating a reliability value for a received multilevel signal in relation to a number of predetermined signal symbols each associated with a corresponding bit sequence including a first bit position; the reliability value being indicative of likelihood information of receiving said multilevel signal comprises the steps of identifying a first one of the number of signal symbols as being closest to the received multilevel signal; and estimating the reliability value based on a stored pre-computed distance function of at least the first signal symbol and a second one of the number of signal symbols, where the second signal symbol is the signal symbol closest to the first signal symbol of the signal symbols corresponding to a different binary value at the first bit position of the respective associated bit sequence than the first signal symbol.

Given a signal constellation, for each signal symbol and for each bit position it is known which one of the other signal symbols having an opposite value at that bit position is closest to that signal symbol. Based on this information, a distance function of the signal symbol and the closest signal symbol with opposite bit position may be pre-calculated and stored in a look-up table. Here, the term pre-computed distance function comprises any intermediate result of the computation of the reliability value from the first and second signal symbol.

It has been realised by the inventors that the calculation of the reliability values may be based on a pre-computed distance function where the function is pre-computed given the first signal symbol and a second signal symbol, i.e. a pre-computed function of the first and the second signal symbol. The second signal symbol is the signal symbol that is closest to the first signal symbol of all signal symbols of the number of signal symbols that have a different binary value at the first bit position of the respective associated bit sequence than the first signal symbol. Hence, the complexity of the calculations to be performed upon receipt of a signal symbol is considerably reduced. Hence, the above method is particularly well-suited for low-complexity implementations in mobile receivers, as it reduces the required computational resources.

It is a further advantage that the closest signal point needed for calculating the likelihood ratio is determined first, such that only the corresponding distances to the identified signal points need to be determined. In this way, the computational complexity is reduced significantly, since not more than two distances need to be calculated in order to determine the likelihood ratio for each bit.

According to a preferred embodiment of the invention, the stored pre-computed distance function comprises the distance between the first signal symbol and the second signal symbol, and the step of estimating the reliability value further comprises the step of determining a first distance between the received signal and the first signal symbol. Hence, the actual distance between the first and the second symbol is precalculated and stored. Once the first signal symbol is identified, this stored distance may be looked up and used as an approximation for the distance between the received signal and the second signal symbol. Consequently, a further reduction in computational complexity is achieved, since only one distance has to be calculated.

When the step of estimating the reliability value comprises the step of determining a polynomial function of the first distance and the second distance between the first signal symbol and the second signal symbol, multiplied by a predetermined constant, the computational complexity is further reduced, as no logarithm needs to be calculated. In one embodiment, the polynomial function is a difference of the squared distances.

According to yet another preferred embodiment of the invention, the stored pre-computed distance function is indicative of one of a number of functional relations between the received multilevel signal and the reliability value, and the step of estimating the reliability value further comprises the step of selecting a functional relation of said number of functional relations dependant on the first signal symbol and the first bit position. Hence, the calculation of the likelihood value only comprises the step of calculating the corresponding stored function. Preferably, the functional relationship is a linear function of a signal component, thereby reducing the calculation to a multiplication operation and an adding operation.

According to yet another preferred embodiment, the stored pre-computed distance function comprises, for each signal symbol and bit position, an approximation of the corresponding reliability value. Hence, according to this embodiment, an approximation of the reliability value may be directly looked up once the closest signal symbol is identified, thereby providing a computationally very efficient method which eliminates the need of online distance calculations.

Preferably, the stored information is stored in a look-up table comprising a plurality of pre-computed distance functions indexed by the number of signal symbols and the bit positions of the number of bit sequences, thereby providing fast access to the information.

In one embodiment of the invention, the method further comprises the step of providing the reliability value as an input to a decoder, e.g. an iterative decoder using the BCJR algorithm or any other decoder using soft values as an input. It is an advantage of the invention that it provides an accurate and resource-efficient approximation of soft values as an input to such decoders.

The first signal symbol may be identified by comparing the signal components with predetermined thresholds or decision boundaries, for instance by means of a slicer, i.e. a circuit which compares a signal with predetermined thresholds. Hence, a fast and computationally inexpensive method is provided for identifying the closest signal symbol without the necessity of calculating all distances between the received value and all signal symbols.

It is a further advantage of the invention that cost-effective, standard components may be employed when implementing a method according to the invention.

When the likelihood information comprises a log-likelihood ratio, a high performance quality Is achieved, as the use of a log-likelihood corresponds a theoretically optimal way of calculating soft reliability values. However, other methods of calculating likelihood information may be employed, such as a log-likelihood of the signal power.

In a preferred embodiment of the invention the step of identifying the first signal symbol as being closest to the received multilevel signal comprises the step of identifying the first signal symbol as being closest to the received multilevel signal with respect to a Euclidean distance measure in a signal space, as the Euclidean distance is directly related to the probabilities of a likelihood calculation. Alternatively, other suitable known metrics may be used instead Euclidean distances.

The signal space may be a real or complex signal space. For example, in QAM modulation two amplitude-modulated signals are transmitted on a single carrier, but shifted in phase by 90 degrees. Hence, the resulting signal points may be represented in the complex plane representing the so-called in-phase (I) and quadrature (Q) components of the QAM signal. In general, in M-QAM, the corresponding signal constellation comprises M signal symbols, where $M=2^n$, $n=2, 3, 4, 5, 6, 7$, etc.

When the number of signal symbols is associated with the number of bit sequences such that the bit sequences associated with all nearest neighbours of each signal symbol only differ from the bit sequence of that signal symbol at one bit position, the error rate of the transmission system is reduced. This form of mapping is referred to as Gray mapping.

The invention further relates to an arrangement for generating a reliability value for a received multilevel signal in relation to a number of predetermined signal symbols each associated with a corresponding bit sequence including a first bit position; the reliability value being indicative of likelihood information of receiving said multilevel signal; characterised in that the arrangement comprises first processing means adapted to identify a first one of the number of signal symbols as being closest to the received multilevel signal;

storage means adapted to store information related to the first signal symbol and a second one of the number of signal symbols being closest to the first signal symbol and corresponding to a different binary value at the first bit position of the respective associated bit sequence than the first signal symbol; and second processing means adapted to estimate the reliability value on the basis of the stored information.

The arrangement may be implemented by any processing unit, e.g. a programmable microprocessor, an application-specific integrated circuit, or another integrated circuit, a smart card, or the like. The term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), etc., or a combination thereof. The processing means may be a CPU of a computer, a microprocessor, a smart card, a SIM card, or the like. The first and second processing means may be separate processing means, e.g. separate circuits, or they may be combined in one processing means, e.g. performed by suitable instructions executed by a programmable microprocessor.

The term storage means includes magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, etc.

Furthermore, the above discussed features and steps of the method according to the invention may be incorporated in the above arrangement according to the invention.

The invention further relates to a device for receiving multilevel signals comprising an arrangement as described above and in the following.

The device may be any electronic equipment or part of such electronic equipment, where the term electronic equipment includes computers, such as stationary and portable PCs, stationary and portable radio communications equipment. The term portable radio communications equipment includes mobile radio terminals such as mobile telephones, pagers, communicators, e.g. electronic organisers, smart phones, PDAs, or the like.

The invention will be explained more fully below in connection with preferred embodiments and with reference to the drawings, in which.

Figure 1A:
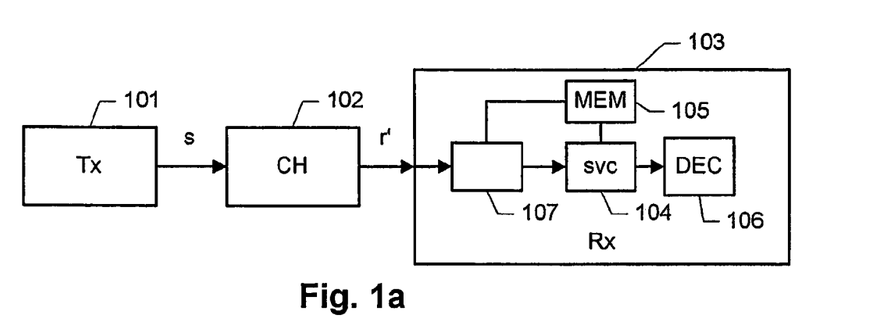
FIGS. 1a-b schematically show a receiver according to an embodiment of the invention.

FIG. 1a schematically shows a receiver according to an embodiment of the invention receiving a radio signal from a transmitter via a communications channel. Transmitter 101 is adapted to send a signal s via a noisy channel 102 to receiver 103. The signal s represents one of a set of M signal points $S_1 \ldots S_M$ in a signal space where each signal point is related to a respective bit sequence of $\log_2(M)$ bits. In the presence of noise in the transmission channel 102, the receiver 103 receives a signal r' that deviates from the transmitted signal s. In one embodiment the signal is a Code Division Multiple Access (CDMA) signal using a spread spectrum technique. The receiver 103 comprises a receiver circuit 107 for transforming the received spread spectrum signal into the signal symbol r. The receiver further comprises a channel decoder 106 for decoding the received signal symbol r, e.g. a BCJR or Viterbi decoder. The decoder 106 requires soft bit values as an input. Hence, the receiver 103 further comprises a circuit 104 which is adapted to calculate soft values for the $\log_2(M)$ bits of the received signal symbol r and to provide the calculated soft values to the decoder 106. According to the invention, the receiver 103 further comprises a memory 105, such as on-chip memory, EPROM, flash memory, or the like, in which a look-up table is stored for use in an efficient calculation of the soft values by the circuit 104, preferably as described in connection with FIGS. 3-9.

Figure 1B:
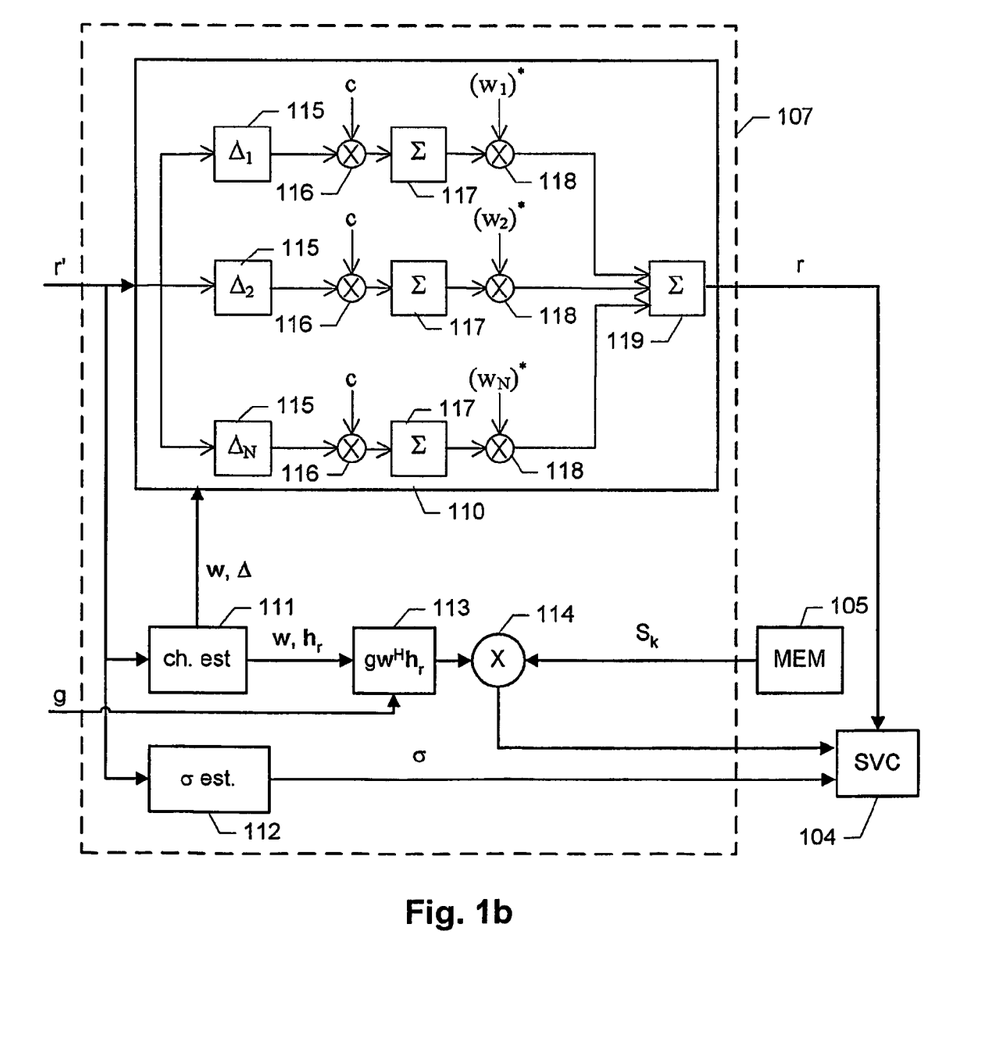

FIG. 1b schematically shows a more detailed block diagram of the receiver circuit 103 of FIG. The circuit 107 comprises a RAKE receiver 110 suitable for receiving CDMA signals, i.e. a receiver which uses several baseband correlators to individually process several signal multipath components. The correlator outputs are combined to achieve improved communications reliability and performance (see e.g. "Digital Communications" 4th Edition, by John G. Proakis, McGraw-Hill, 2000). The sampled received radio signal r' is fed to the RAKE receiver 110 which generates the signal symbol r to be decoded. The circuit 107 further comprises a channel estimator 111 and a noise estimator 112, e.g. implementing any suitable channel estimation and noise estimation technique known in the art. The channel estimator receives the received radio signal r, identifies up to N different radio paths or channel taps and estimates corresponding delays $\Delta_k$, k=1, . . . ,N, and complex channel estimate $h_r=(h_{r1}, \ldots h_{rN})$ of these paths. The channel estimator 111 further provides a set of complex combiner weights $w=[w_1 w_2 \ldots w_N]^T$ to be used by the rake receiver. Here, $\square^T$ denotes a transposed vector. For example, the weights may be determined according to an optimisation criterion, such as maximising the received signal energy.

The calculated delays $\Delta_k$ and the combiner weights are provided to the rake receiver 110. The RAKE receiver 110 comprises delay circuits 115 which delay the incoming signal according to the N channel taps. Further, the receiver 110 comprises circuitry 116 for multiplying the N delayed versions of the received signal with a spreading code c for dispreading the spread spectrum signals and circuitry 117 for summing the signals to form a radio symbol. Furthermore, the rake receiver 110 comprises multiplier circuitry 118 for multiplying each of the N radio symbols with the combiner weights $(w_k)^*$, k=1, . . . ,N, where ( )* denotes complex conjugation. Finally, the RAKE receiver 110 comprises an adding circuit 119 which combines the weighted symbols to form the received symbol estimate r which is fed to the soft value calculation circuit 104.

When using a multilevel constellation of signal points $S_1 \ldots S_M$ the amplitude information should be maintained in order to ensure successful demodulation in the receiver. Consequently, the reference points $S_1 \ldots S_M$ should be scaled properly. In the following it Is assumed that the channel estimator 111 estimates the channel gain on the basis of a reference channel $h_r$ which has a channel gain that may be different from the actual gain of the traffic channel, e.g. a HS-DSCH. The gain difference between the reference channel and the traffic channel may be denoted with g. Hence, the received symbol r after the RAKE receiver 110 may be expressed as $$r = g w^H h_r s + n,$$

where $w^H$ is the Hermitian conjugate of w, $w^H h_r$ denotes an inner product, s is the transmitted symbol and n is a noise term, e.g. representing additive white Gaussian noise (AWGN). The gain parameter g is signalled to the receiver, w is selected by the combiner in the receiver, and $h_r$ are the channel estimates. Hence, at the receiver, the reference signal symbols $S_1 \ldots S_M$ may be scaled appropriately, according to $$\hat{S}_j = g w^H h_r S_j, j=1,\ldots,M. \tag{0}$$

In FIG. 1b, the receiver circuit 107 comprises circuit 113 adapted to calculate the above scaling factor $g w^H h_r$ and a multiplier circuit 114 for multiplying the reference symbols with the scaling factor, resulting in properly scaled signal symbols $\hat{S}_1, \ldots, \hat{S}_M$, which are fed into the soft value calculation circuit 104.

Finally, the noise estimator 112 provides an estimate of the signal noise level σ which is fed into the soft value calculation circuit 104.

According to the invention, the soft value calculation circuit locates the signal symbol which is closest to the received signal r and calculates corresponding soft values $L_m$ for bit m, m=1, . . . ,$\log_2(M)$, e.g. according to one of the embodiments discussed in connection with FIGS. 3-9.

It is noted that the receiver circuit described in connection with FIGS. 1a-b merely serves as an example, and the scope of the invention is not limited to the type of receiver, nor to the above scaling of signal symbols.

Figure 2:
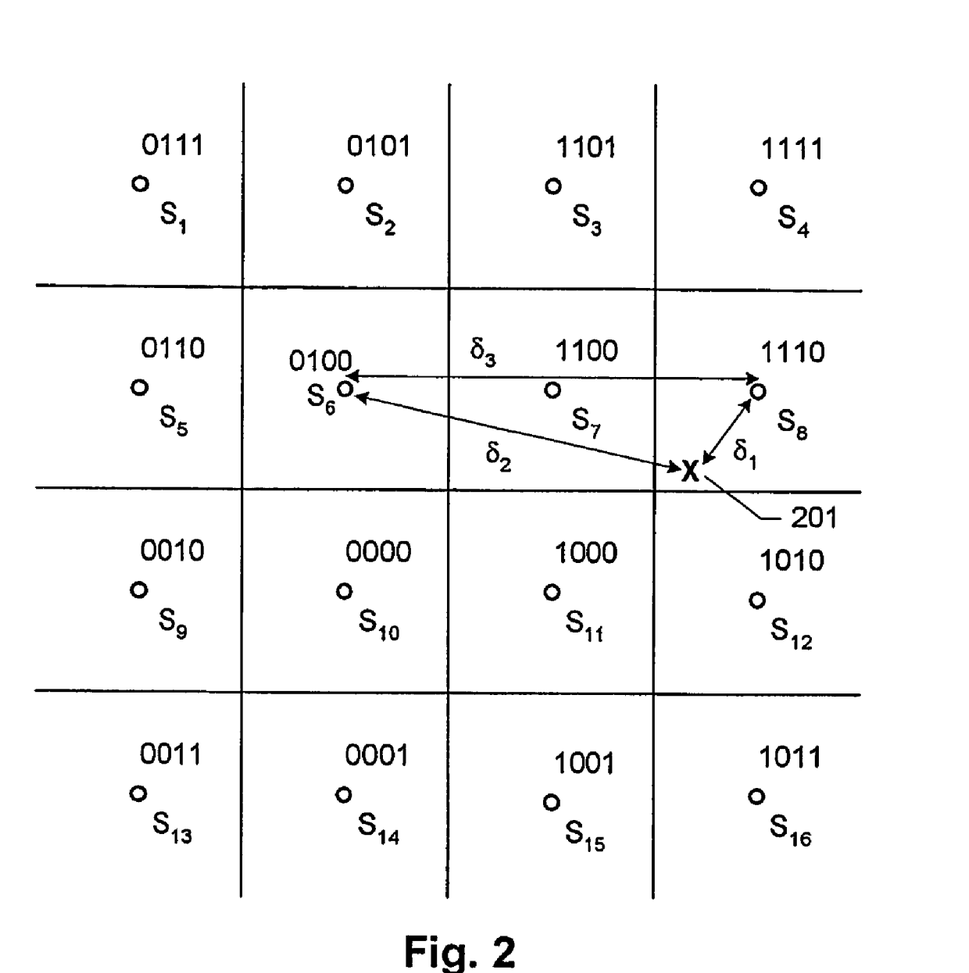
FIG. 2 shows an example of a signal constellation with 16 signal symbols.

FIG. 2 shows a signal constellation with 16 signal symbols. The signal constellation comprises M=16 signal points $S_1$ through $S_{16}$ in a two-dimensional signal space, e.g. the I/Q components in a 16QAM signal constellation. Preferably, the signal points are distributed regularly, such that the distance to the nearest neighbours of each signal point is the same. The reference points may take values that suit the implementation in question. However, alternatively, other signal constellations may be chosen. In FIG. 2, 16 different bit sequences 0000 through 1111, each consisting of $\log_2(M)=4$ bits, are mapped onto the signal points $S_1$-$S_{16}$. Preferably, the mapping of the bit sequences to the signal points is chosen such that the bit sequence of each signal point only differs from those of the nearest neighbours by one bit, thereby optimising the decoding performance. For example, in FIG. 2, signal point $S_8$ has three nearest neighbours, $S_4$, $S_7$, and $S_{12}$. The bit sequence of $S_4$, i.e. 1111, differs from the sequence 1110 of $S_8$ only at bit position 4, etc. Alternatively, other mappings may be chosen.

For every bit position m mapped on a signal point, the signal points in the constellation may be divided into two sets where the signal points in each set have bit value 0 and 1, respectively, at that position. In the following, the set of signal points with a 0 at the m-th position is denoted $A_{0,m}$, and the corresponding set with a 1 at the m-th position is denoted $A_{1,m}$. For example, in the example of FIG. 2 and for m=1, $A_{1,1}=\{S_3, S_4, S_7, S_8, S_{11}, S_{12}, S_{15}, S_{16}\}$ and $A_{0,1}=\{S_1, S_2, S_5, S_6, S_9, S_{10}, S_{13}, S_{14}\}$. The sets are of equal size with M/2 elements each.

When one of the signals $S_1, \ldots, S_{16}$ is transmitted over a noisy channel, the received signal will differ from the transmitted signal according to a corresponding distribution. The actual shape and width of the distribution of received signals depends on the characteristics of the noise. In FIG. 2, the cross 201 represents an example of a received signal r.

Prior to providing the received 16QAM radio symbols to a decoder, e.g. a turbo decoder, they are converted into soft values. Hence, a soft value is calculated for each bit of every 16QAM symbol. A soft value of the m-th bit in the sequence mapped to r may be defined as $$L_m = \log\frac{P(s_m = 1 \mid r)}{P(s_m = 0 \mid r)} \quad (1)$$
$$= \log\frac{P(s_m = 1) P(r \mid s_m = 1)}{P(s_m = 0) P(r \mid s_m = 0)}$$
$$= \log\frac{P(r \mid s_m = 1)}{P(r \mid s_m = 0)}$$

where $s_m$ is the m-th bit in the bit sequence represented by the transmitted signal, and $P(s_m=i|r)$, i=0,1, are the a posteriori probabilities of the bit $s_m$ where r is the received signal. It is noted that the second equality assumes that $s_m=1$ and $s_m=0$ are equally probable in the chosen alphabet. Otherwise, the overall ratio of probabilities should be taken into consideration in the following. However, this would only give rise to a constant factor. Hence, $L_m$ corresponds to a log-likelihood ratio of probabilities. The probabilities $P(r|s_m=i)$ in eqn. (1) may be written as $$P(r \mid s_m = i) = \frac{2}{M}\sum_{s \in A_{i,m}} P(r, s), \quad i = 0, 1. \quad (2)$$

Hence, the calculation of the above probability involves a summation over M/2 terms each including a joint probability P(r,s). This is a computationally expensive task, especially if M is large, e.g. M=64.

In many applications, the above soft values $L_m$ may be approximated by $$L_m = \log\frac{\max_{s \in A_{1,m}} P(r, s)}{\max_{s \in A_{0,m}} P(r, s)} \quad (3)$$
$$= \log\frac{P(r \mid \hat{s}_{1,m})}{P(r \mid \hat{s}_{0,m})},$$

where $\hat{s}_{i,m}$, i=0,1, are the signal points that result in the largest contribution to the sums in eqn. (2). Hence, in the calculation of the probabilities, the sums over M/2 terms are approximated by the their respective dominant terms, according to $$\log \sum_{s \in A_{i,m}} P(r, s) \approx \log \max_{s \in A_{i,m}} P(r, s). \quad (4)$$

The above approximation is often referred to as the "max log MAP" approximation which yields a good approximation in cases where the above sums are dominated by one term, as for example in the case of Gaussian noise when the signal to noise ratio (SNR) is large. The above probabilities depend on the distances between the received signal r and the respective signal points. For example, in the case of additive zero-mean Gaussian noise with variance $\sigma^2$, the log-likelihood ratio of eqn. (3) may be expanded as $$L_m = \log\frac{\sigma^{-2} \exp(-|r - \hat{s}_{1,m}|^2/\sigma^2)}{\sigma^{-2} \exp(-|r - \hat{s}_{0,m}|^2/\sigma^2)} \quad (5)$$
$$= \sigma^{-2}(|r - \hat{s}_{0,m}|^2 - |r - \hat{s}_{1,m}|^2).$$

It is noted that it is assumed that the $\hat{s}_{i,m}$ are scaled corresponding to the received signal according to equation (0) above. In the following, we define $d_{i,m}=|r-\hat{s}_{i,m}|$, for i=0,1, to be the distances between the received signal r and the closest signal points in the sets $A_{i,m}$, respectively. For example, in FIG. 2, for m=1, $d_{0,1}$ corresponds to the distance $\delta_2$ between r and the closest signal point in $A_{0,1}$, i.e. $S_6$, while $d_{1,1}$ corresponds to the distance $\delta_1$ between r and the closest signal point in $A_{1,1}$, i.e. $S_8$. According to the invention, the likelihood ratio in equation (5) is obtained by first identifying the closest signal point $S_8$, and then determining the distances $\delta_1$ and $\delta_2$, as will be described in greater detail below. Hence, a computationally expensive calculation of all the distances between r and all the signal points $S_1 \ldots S_{16}$ in order to identify the shortest distances $\delta_1$ and $\delta_2$ is avoided. Alternatively to identifying $S_6$ by means of a look-up table and then calculating $\delta_2$, the distance $\delta_3$ between $S_6$ and $S_8$ is looked up and used as an approximation instead of $\delta_2$, thereby saving additional computational resources. This will be described in greater detail in connection with FIGS. 5-6. A further embodiment of the invention will be described in connection with FIGS. 8-9.

It is noted that, preferably, in the above estimation of the reliability values, a proper scaling of the signal points in the QAM constellation is taken into consideration. If this scaling is taken into consideration, the above log-likelihood ratio may be written as $$L_m = \sigma^{-2} \cdot (|r-\hat{s}_{0,m}|^2 - |r-\hat{s}_{1,m}|^2). \tag{6}$$

As described in connection with FIG. 1b, when using a multilevel constellation as in the example of FIG. 2, the amplitude information should be maintained in order to ensure successful demodulation in the receiver. Consequently, the reference points $S_j$, $j=1, \ldots, 16$ should be scaled properly. If this scaling is taken into consideration, the above log-likelihood ratio may be written as $$L_m = K \cdot (|\tilde{r}-\tilde{s}_{0,m}|^2 - |\tilde{r}-\tilde{s}_{1,m}|^2), \tag{7}$$

i.e. with the properly scaled signals $$\tilde{r} = \frac{r}{gw^H h_r} \tag{8}$$

$$\tilde{s}_{i,m} = \frac{\hat{s}_{i,m}}{gw^H h_r} \quad m=1, \ldots, \log_2(M), \quad i=0,1,$$

and where $$K = (gw^H h_r)^2 / \sigma^2 \tag{9}$$

is a constant which depends on the signal to noise ratio.

Figure 3:
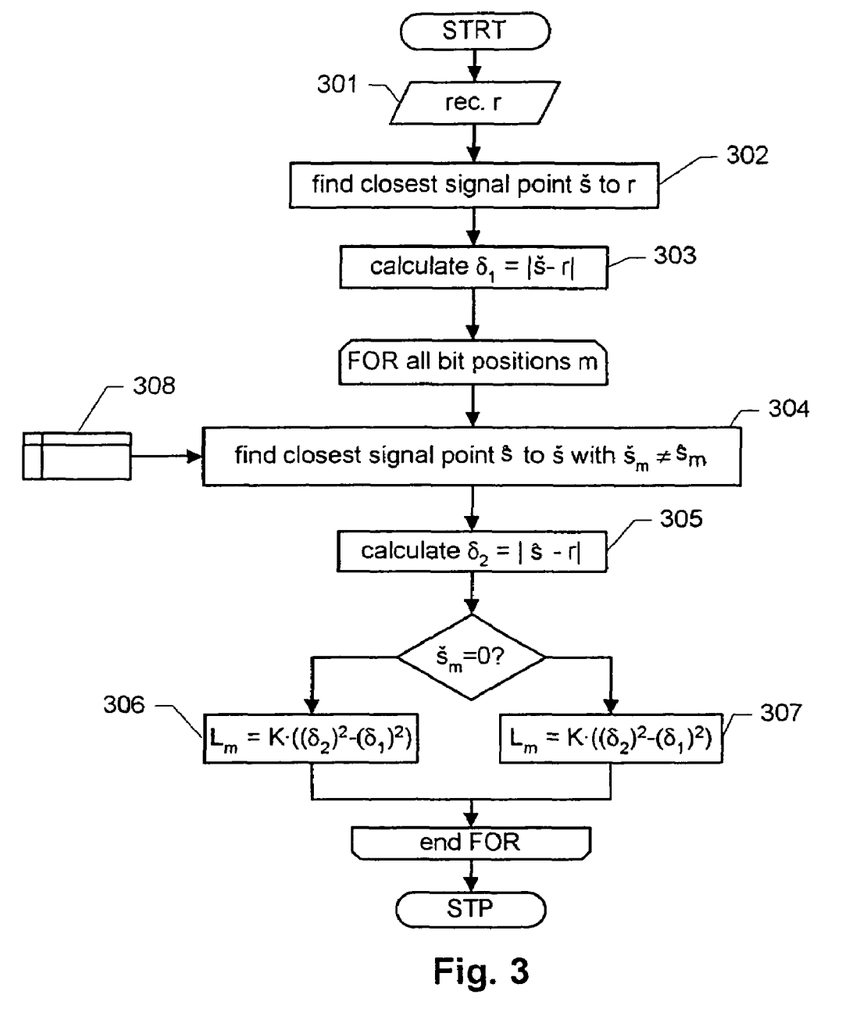
FIG. 3 shows a flow diagram of a method of determining reliability values.
Figure 4:
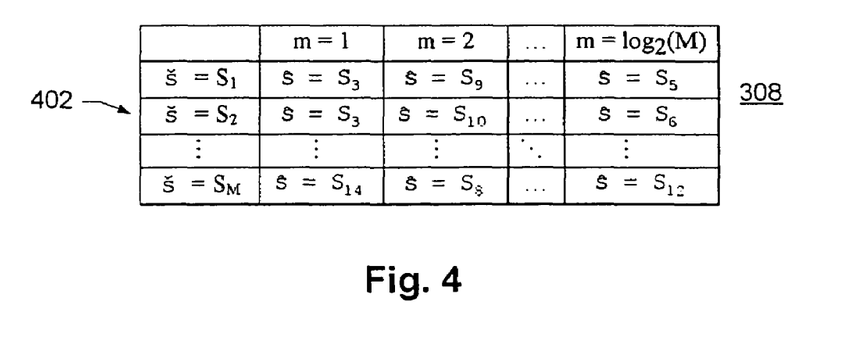
FIG. 4 shows an example of a look-up table for use in the method of FIG. 3.

FIG. 3 shows a flow diagram of a method of determining reliability values. According to this method, the soft values $L_m$ are calculated using the approximation in equation (7). Initially, in step 301, a signal r is received and, in step 302, the signal point š from the set of signal points $S_1 \ldots S_M$ which, according to a Euclidean metric, is closest to r is identified. For example, an efficient way of identifying š is by means of a slicer. In step 303, the distance $\delta_1$ between r and š is calculated. Subsequently, for bit positions $m=1,\ldots,\log_2(M)$, the following steps are performed: In step 304, the signal point ŝ which is closest to š is looked up in a look-up table 308. This signal point corresponds to the signal point which is closest to r and has the opposite bit value at position m than š. In step 305, the distance $\delta_2$ between r and ŝ is calculated. Based on the distances $\delta_1$ and $\delta_2$, the soft value $L_m$ is now approximated according to eqn. (7) above: If the bit value $\hat{s}_m$ of ŝ at position m is 0, the soft value is approximated by $L_m = K \cdot ((\delta_2)^2 - (\delta_1)^2)$ (step 306). Otherwise the soft value is approximated by $L_m = K \cdot ((\delta_1)^2 - (\delta_2)^2)$ (step 307). Here, K is a constant which depends on the noise distribution as described above. Referring to the example illustrated in FIG. 2, the closest signal point to the received signal r (marked by the cross 201) is š=$S_8$. When calculating a soft value $L_1$ for the first bit position m=1 using the method of FIG. 3, the first bit in $S_8$ is identified to be $š_1=1$. From a pre-computed look-up table, e.g. as illustrated in FIG. 4, the closest signal point with a "0" in the first bit position is ŝ=$S_6$. Hence, the distances $\delta_1$ and $\delta_2$ may be calculated as $\delta_1=|r-S_8|$ and $\delta_2=|r-S_6|$, respectively, where $|\cdot|$ denotes the Euclidean distance. Thus, the soft value $L_1$ is approximated by $L_1 = K \cdot ((\delta_2)^2 - (\delta_1)^2)$.

Consequently, the method described above requires at the most $1+\log_2(M)$ distance calculations, since the closest distance $\delta_1$ has to be calculated once for a received signal (step 303) and, for each bit position m, the distance $\delta_2$ is calculated in step 305. This is to be compared with M distance calculations when all distances to all signal points are calculated. Hence, the computational complexity of this method only grows logarithmically with the size of the symbol alphabet rather than proportional to the alphabet size. This is a considerable reduction of the computational complexity, in particular for large alphabet sizes.

FIG. 4 shows an example of a look-up table for use with the method of FIG. 3. The look-up table 308 identifies the pre-computed closest signal points and is indexed by the bit numbers m and the signal points $S_1 \ldots S_M$. Each row corresponds to one of the signal points $S_1 \ldots S_M$. For example, row 402 corresponds to signal point $S_2$, such that each element in row 402 identifies a signal point which is the closest to $S_2$ among all signal points having a bit value opposite to $S_2$ at bit position m. Each entry in table 308 consumes $\log_2(M)$ bits for identifying one out of M signal points. Furthermore, the table consists of M rows and $\log_2(M)$ columns. Consequently, the table requires $M [\log_2(M)]^2$ bits. For example for M=8 the memory consumption is 72 bits and for M=16 the memory consumption is 256 bits.

Figure 5:
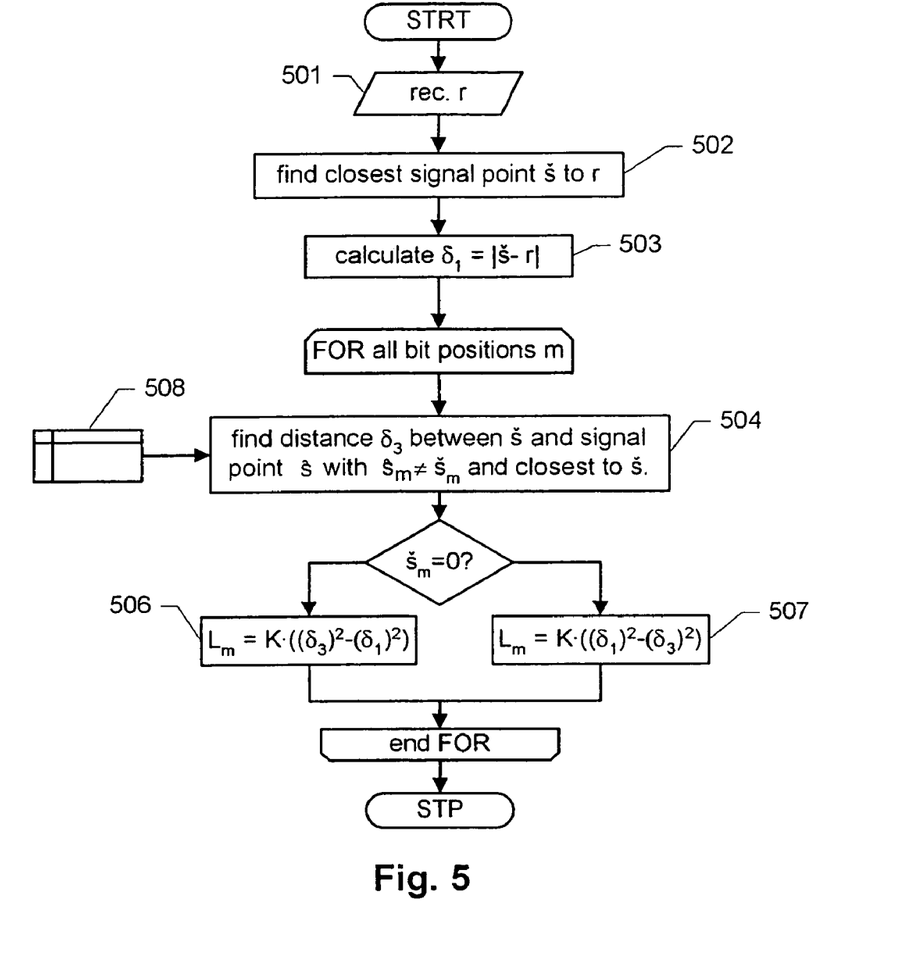
FIG. 5 shows a flow diagram of a method according to an embodiment of the invention.
Figure 6:
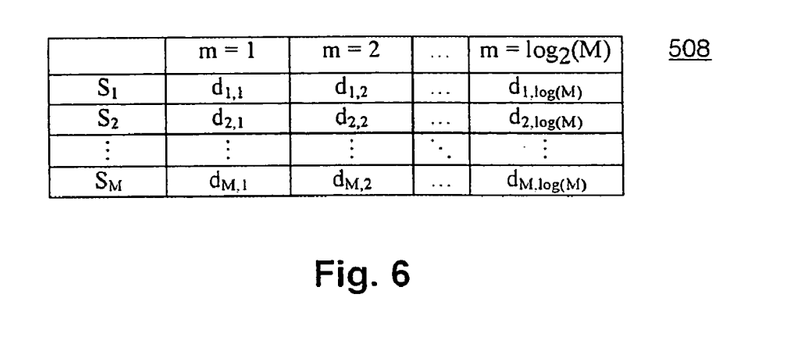
FIG. 6 shows an example of a look-up table according to the embodiment of FIG. 5.

"FIG. 5 shows a flow diagram of a method according to an embodiment of the invention. Again, this embodiment utilises the approximation of equation (7) for the calculation of the soft values $L_m$. As in the method of FIG. 3, in the initial step 501, a signal r is received and, in step 502, the signal point Ŝ from the set of signal points $S_1 \ldots S_M$, which is closest to r is identified, e.g. by means of a slicer. In step 503, the distance $\delta_1$ between r and Ŝ is calculated. Subsequently, for bit positions $m=1, \ldots, \log2(M)$, the following steps are performed: In step 504, the distance $\delta_3$ between Ŝ and the signal point Ŝ̌ which is closest to Ŝ and has the opposite bit value at position m is looked up in a look-up table 508. Subsequently, this distance $\delta_3$ is used as an approximation for the distance $\delta_2$ between r and Ŝ̌ when approximating the soft value Lm according to eqn. (7) above. Hence, if the bit value m of Ŝ at position m is 0, the soft value is approximated by $Lm = K \cdot ((\delta_3)^2 - (\delta_1)^2)$ (step 506). Otherwise the soft value is approximated by $L_m = K \cdot ((\delta_1)^2 - (\delta_3)^2)$ (step 507). Again, K is a constant which depends on the noise distribution. Referring again to the example illustrated in FIG. 2 the closest signal point to the received signal r is Ŝ=$S_8$. When calculating a soft value $L_1$ for the first bit position m=1 using the method of FIG. 5, the first bit in $S_8$ is identified to be $S_1=1$. From a pre-computed look-up table, e.g. as illustrated in FIG. 6, the distance to the closest signal point with a "0", in the first bit position is $d_{1,8}=\delta_3$. Hence, the distance $\delta_1$ is calculated as $\delta_1=|r-S_8|$ and $\delta_2$ is approximated by $\delta_3$. Thus, the soft value $L_1$ is approximated by $L_1 = K \cdot ((\delta_3)^2 - (\delta_1)^2)$."

Consequently, as the pre-computed distance $\delta_3$ is used as an approximation for $\delta_2$, the method according to this embodiment requires only one distance calculation, i.e. the calculation of $\delta_1$ (step 503). Again, this is to be compared with M distance calculations when all distances to all signal points are calculated.

Hence, it is an advantage of this embodiment that the computational complexity does not grow with the size of the symbol alphabet, thereby yielding a computationally efficient method of approximating soft values.

Hence, it is an advantage that storing the look-up table only requires little storage space.

It is a further advantage of the method according to the invention, that it yields a good approximation of the soft values, thereby providing a good decoding performance.

FIG. 6 shows an example of a look-up table according to the embodiment of FIG. 5. The look-up table 508 comprises the pre-computed distances between the signal points in a constellation of size M. A distance $d_{m,k}$ in table 508 denotes the Euclidean distance between signal point $S_k$ and the closest signal point with opposite bit value at position m. Assuming that each distance is stored with a resolution requiring η bits, each entry in the table 508 requires η bits. Furthermore, the table consists of M rows and $\log_2(M)$ columns. Consequently, the table requires η M $\log_2(M)$ bits. For example, for M=8 the memory consumption is 24η bits and for M=16 the memory consumption is 64η bits. Hence, it is a further advantage of this embodiment that it requires little storage capacity. In an embodiment where the resolution of the pre-computed distances is higher than $\log_2(M)$ bits, i.e. η>$\log_2(M)$, processing time is traded for memory space in comparison with the method of FIGS. 3-4.

It is noted that additional storage space may be saved by only storing each distance once, i.e. in case the same distance appears in two or more entries of the table, a reference to that distance may be stored in one of the entries, instead.

Alternatively, other layouts of a look-up table may be used. For example, in one embodiment, the look-up table may comprise all M(M−1)/2 mutual distances between the signal points $S_k$, thus requiring ηM(M−1)/2 bits of storage. However, for M>4 this embodiment requires larger storage capacity than the embodiment of FIG. 6.

Figure 7:
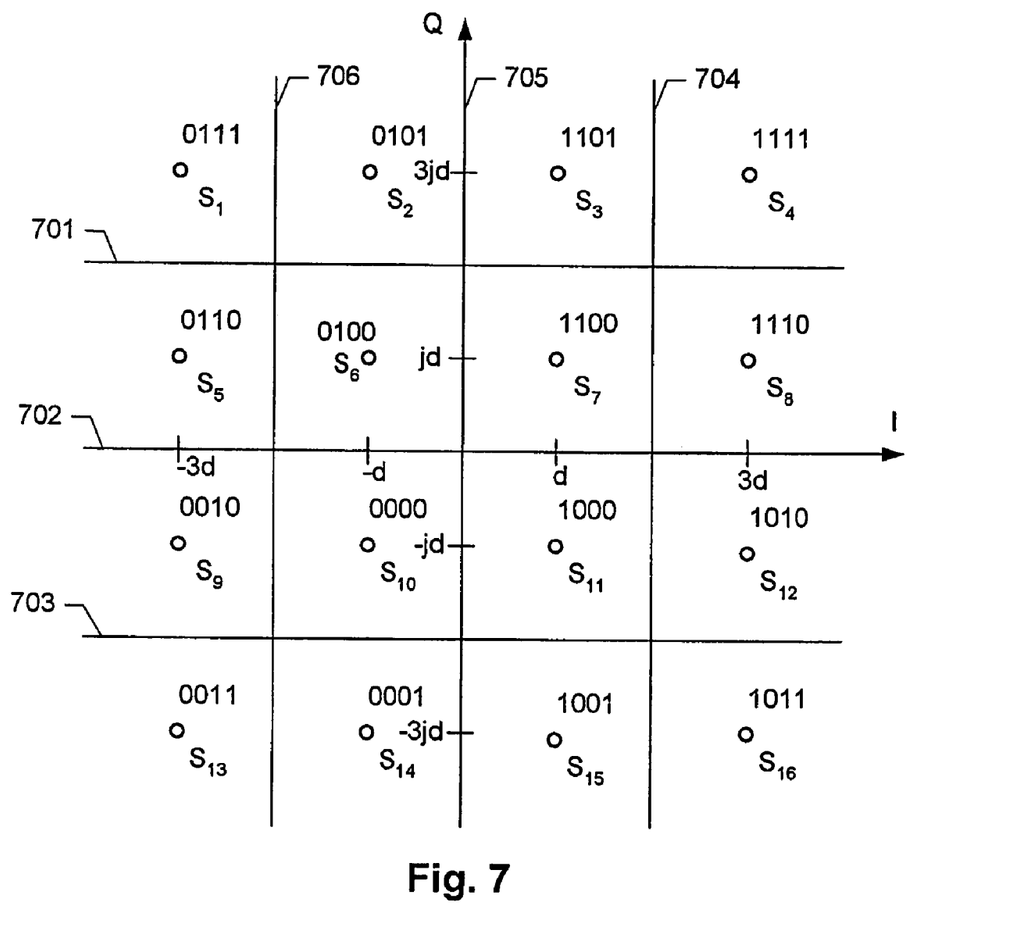
FIG. 7 shows another example of a signal constellation with 16 signal symbols.

FIG. 7 shows another example of a signal constellation with 16 signal symbols. As in FIG. 2, the signal constellation comprises M=16 signal points $S_1$ through $S_{16}$ in a two-dimensional signal space, e.g. the I/Q components in a 16QAM signal constellation. The signal points are distributed regularly, such that the distance to the nearest neighbours of each signal point is the same. In the example of FIG. 7, they are assumed to be selected such that $$S_k = x_k + jy_k, \text{ where } x_k, y_k \in [-3d, -d, d, 3d], k=1, \ldots, M,$$

where d is an arbitrary constant and where $j^2 = -1$. For example, d may be chosen to d=1. However, alternatively, other signal constellations may be chosen.

In FIG. 7, 16 different bit sequences 0000 through 1111, each consisting of $\log_2(16)=4$ bits, are mapped onto the signal points $S_1, \ldots, S_{16}$. Preferably, the mapping of the bit sequences to the signal points is chosen to be a Gray mapping, i.e. such that the bit sequence of each signal point only differs from those of the nearest neighbours by one bit, thereby optimising the decoding performance.

As above, for every bit position m mapped on a signal point, the signal points in the constellation may be divided into two sets $A_{0,m}$ and $A_{1,m}$, where the signal points in each set have bit value 0 and 1, respectively, at that position.

Figure 8:
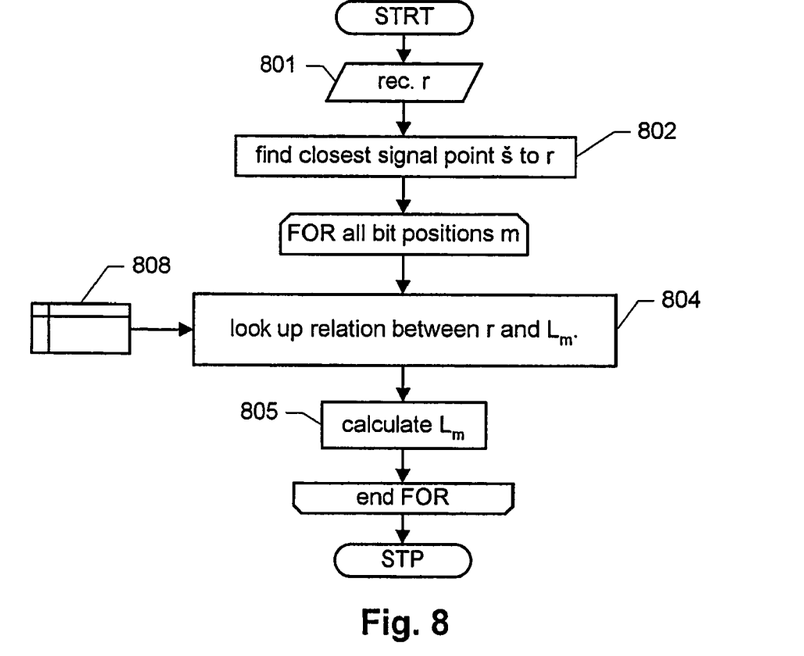
FIG. 8 shows a flow diagram of a method according to another embodiment of the invention.

FIG. 8 shows a flow diagram of a method according to another embodiment of the invention. Again, this embodiment utilises the approximation of equation (7) for the calculation of the soft values $L_m$. As in the embodiment of FIG. 3, in the initial step 801, a signal r is received. The received signal may be written as r=Re(r)+jIm(r) and, in the following the magnitude of the I- and Q components of r will be denoted by a=|Re(r)| and b=|Im(r)|, respectively. After the received symbol is combined in the combiner, in step 802, the signal point š from the set of signal points $S_1 \ldots S_M$, which is closest to r is identified. In this embodiment it is assumed that the constellation of signal points corresponds to the constellation of FIG. 7. In FIG. 7, each signal point corresponds to a decision region where the decision regions are separated by a set of decision boundaries 701 through 706. Hence, the closest signal point š may be found by performing two comparisons of the inphase component and the quadrature component, respectively. For example, if Re(r)<0 (decision boundary 705) and Re(r)<−2d (decision boundary 706) and if Im(r)>0 (decision boundary 702) and Im(r)>2d (decision boundary 701), the received signal lies in the decision region corresponding to $S_1$, i.e. š=$S_1$ is the closest signal point.

Subsequently, for each bit positions m=1, . . . ,$\log_2(16)$= 1, . . . ,4, the soft value $L_m$ may be calculated using the approximation of eqn. (7), assuming proper scaling. Consequently, in this example the soft value $L_1$ for the first bit is $$L_1(S_1) = K(|-a+jb-(d+3jd)|^2 - |-a+jb-(-3d+3jd)|^2) = K(8ad - 8d^2),$$

Hence, in the above equation, instead of computing two distances squared, each involving a calculation of the type $|x+jy|^2$, the soft value may be calculated by scaling the inphase amplitude a of the received symbol with 8dK and, subsequently, by adding a constant $-8Kd^2$. It is further noted that the constant d may be chosen as any suitable positive real number.

The remaining three soft values for a received signal in the decision region corresponding to $S_1$ are accordingly:

$$L_2(S_1) = K(|-a+jb-(-3d+3jd)|^2 - |-a+jb-(-3d-jd)|^2) = K(-8bd+8d^2)$$

$$L_3(S_1) = K(|-a+jb-(-d+3jd)|^2 - |-a+jb-(-3d+3jd)|^2) = K(4ad-8d^2)$$

$$L_4(S_1) = K(|-a+jb-(-3d+3jd)|^2 - |-a+jb-(-3d+jd)|^2) = K(4bd-8d^2),$$

as in the constellation of FIG. 7 the closest symbols with opposite second, third, and fourth bit compared to $S_1$ are $S_9$=−3 3d−jd, $S_2$=−d+3jd, and $S_5$=−3d+jd, respectively.

Figure 9:
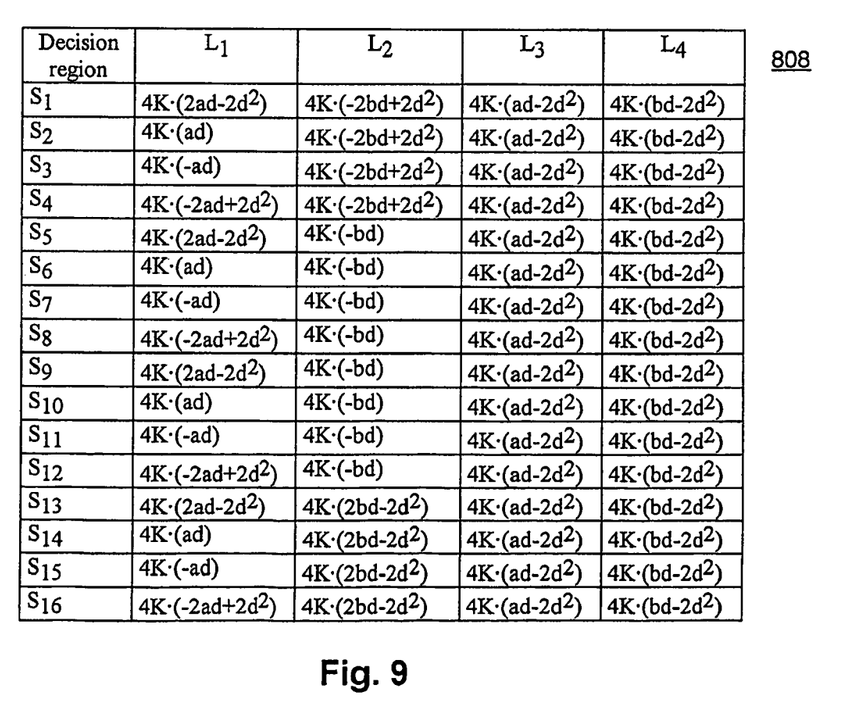
FIG. 9 shows an example of a look-up table according to the embodiment of FIG. 8.

The table 808 of FIG. 9 illustrates the calculated soft values for all decision regions corresponding to the symbols $S_1, \ldots, S_{16}$, and for all bits, m=1, . . . ,4. As can be seen from table 808, all soft values may be calculated by scaling one of the inphase component a or quadrature component b of the received signal r and subsequently adding a constant. Hence, using the pre-calculated equations of table 808, the soft values may be calculated in a very efficient way. In one implementation, each entry of the look-up table 808 may comprise the scaling factor, the constant to be added and a bit indicating whether it is the inphase component a or the quadtrature component b of the received signal r which is to be scaled for a given soft value. Preferably, the table is indexed by the decision region and the bit values. It is noted, however, that many of the entries of table 808 are identical. Consequently, it will be apparent to a skilled person that table 808 may be stored in a memory efficient manner, e.g. by storing a list of the distinct entries and, in table 808, referring to the corresponding list members. In general, it is noted that constellations which are Gray coded or show another regularity, the redundancy of the entries in table 808 may be utilised to reduce the memory consumption of table 808.

Referring again to FIG. 8, in steps 804-805 the soft values for the identified decision region and for all bits are calculated. In step 804, the relation to be calculated, i.e. the scaling factor and the constant to be added, are retrieved from a stored table 808 in memory, e.g. a look-up table as shown in FIG. 9. The retrieved relation is calculated in step 805 resulting in the soft value for the corresponding bit number.

It is noted that the processing load in the receiver may further be decreased by pre-calculating the relations of table 808 and by storing the pre-calculated soft values: Assuming that the inphase and the quadrature components of the received signal each are quantised to n bits, the soft values of table 808 may be precalculated and tabulated for every different inphase and quadrature value, thereby further decreasing the required calculations, as the scaling and adding of step 805 are not necessary in this embodiment. However, such a table of pre-calculated soft values increases the memory consumption. Above, a=|Re(r)| and b=|Im(r)| were defined as the absolute values of the real and imaginary parts of r, respectively, i.e. without sign information. Hence, a and b, each are represented by n−1 bits. If each of the pre-calculated soft values is to be represented by m bits, the total memory consumption of a full table is m $2^{n-1}$ 4 16 bits (for each of the 16 decision regions and each of the 4 bits, $2^{n-1}$ different soft values are stored, each with a precision of m bits). For example, for n=4, the total memory is 512 m bits. Note, however, that in this embodiment, the pre-calculated table still needs to be multiplied with the factor K.

It is noted, that the above memory consumption may be further reduced by utilising the fact that many of the entries of table 808 are identical and by utilising the symmetry of the constellation of FIG. 7.

It is noted that the invention was described in connection with soft values defined as a log-likelihood ratio indicating a reliability value for the bit values of a received sequence. However, other definitions of soft values depending on the distance of the received signal to the signal points may be used as well.

It is further noted that the signal constellations of FIGS. 2 and 7 are merely used as examples. The calculation of soft values according to the invention is not limited to these signal constellations.

Finally, it is noted that the embodiment described in connection with FIGS. 5-6 is particularly well suited for large signal constellations, as it saves memory, whereas the embodiment of FIGS. 8-9 is particularly well suited for Implementing a medium-size signal constellation, e.g., 16QAM, as it saves computational resources.

The invention claimed is:

1. A method for use in a decoder, comprising the steps of:
generating a reliability value from a received multilevel signal in relation to a number of predetermined signal symbols each associated with a corresponding bit sequence including a first bit position, the soft value being indicative of a reliability value for the first bit position;
identifying a first one of the number of signal symbols as being closest to the received multilevel signal;
estimating the soft value as a function of a first distance between the received signal and the first signal symbol and of a second distance between the received signal and a second one of the number of signal symbols that is closest to the first signal symbol and corresponds to a different binary value at the first bit position of the respective associated bit sequence than the first signal symbol;
inputting the reliability value into a decoder that uses soft values as an input; and
wherein estimating the soft value comprises estimating the second distance by a stored third distance between the first signal symbol and the second signal symbol.

2. The method according to claim 1, wherein the step of estimating the soft value comprises the step of determining a polynomial function of the first distance and the second distance, wherein the polynomial function is multiplied by a predetermined constant (K).

3. The method according to claim 2, wherein the predetermined constant is selected depending on the noise distribution of the received multilevel signal.

4. The method according to claim 1, wherein the third distance is stored in a look-up table indexed by the number of signal symbols and the bit positions.

5. A The method according to claim 1, wherein the method further comprises the step of providing the soft value as an input to a decoder.

6. The method according to claim 1, wherein the soft value is calculated as a log-likelihood ratio.

7. The method according to claim 1, wherein the step of identifying the first signal symbol as being closest to the received multilevel signal comprises the step of identifying the first signal symbol as being closest to the received multilevel signal with respect to a Euclidean distance measure in a signal space.

8. The method according to claim 7, wherein the signal space is related to the complex plane in quadrature amplitude modulation.

9. The method according to claim 1, wherein the number of signal symbols are associated with the number of bit sequences such that the bit sequences associated with all nearest neighbors of each signal symbol only differ from the bit sequence of that signal symbol at one bit position.

10. A device for use with a decoder, comprising:
means for generating a soft value from a received multilevel signal in relation to a number of predetermined signal symbols each associated with a corresponding bit sequence including a first bit position, the soft value being indicative of a reliability value for the first bit position;
processing means adapted to
identify a first one of the number of signal symbols as being closest to the received multilevel signal; and
estimate the soft value as a function of a first distance between the received signal and the first signal symbol and of a second distance between the received signal and a second one of the number of signal symbols, that is closest to the first signal symbol and corresponds to a different binary value at the first bit position of the respective associated bit sequence than the first signal symbol;
storage means adapted to store a third distance between the first signal symbol and the second signal symbol; and
wherein the processing means is further adapted to estimate the second distance by the stored third distance.

11. The device according to claim 10, wherein the processing means is further adapted to determine a polynomial function of the first distance and the second distance, wherein the polynomial function is multiplied by a predetermined constant (K).

12. The device according to claim 11, wherein the predetermined constant is a function of the noise distribution of the received multilevel signal.

13. The device according to claim 10 wherein the storage means is adapted to store a the third distance in a look-up table indexed by the number of signal symbols and the bit positions.

14. A method for use with a decoder, comprising the steps of:
generating a soft value from a received multilevel signal in relation to a number of predetermined signal symbols each associated with a corresponding bit sequence including a first bit position, the soft value being indicative of a reliability value for the first bit position, the method further comprising:
identifying a first one of the number of signal symbols as being closest to the received multilevel signal;
estimating the soft value as a function of a first distance between the received signal and the first signal symbol and of a second distance between the received signal and a second one of the number of signal symbols that is closest to the first signal symbol and corresponds to a different binary value at the first bit position of the respective associated bit sequence than the first signal symbol; and wherein estimating the soft value further comprises the step of selecting, dependent on the first signal symbol and the first bit position, one of a number of stored functional relations between the received multilevel signal and the soft value.

15. The method according to claim 14, wherein the stored functional relations are stored in a look-up table indexed by the number of signal symbols and the bit positions.

16. The method according to claim 1, wherein identifying the first signal symbol comprises comparing the signal components of the received multilevel signal with predetermined threshold values.

17. A device for use with a decoder, comprising:
means for generating a soft value from a received multilevel signal in relation to a number of predetermined signal symbols each associated with a corresponding bit sequence including a first bit position, the soft value being indicative of a reliability value for the first bit position, the device;
processing means adapted to
identify a first one of the number of signal symbols as being closest to the received multilevel signal; and
estimate the soft value as a function of a first distance between the received signal and the first signal symbol and of a second distance between the received signal and a second one of the number of signal symbols that is closest to the first signal symbol and corresponds to a different binary value at the first bit position of the respective associated bit sequence than the first signal symbol;
storage means adapted to store a number of functional relations between the received multilevel signal and the soft value;
output means adapted to output the reliability value from the device to an input of a decoder; and
wherein the processing means is further adapted to select a functional relation of said number of functional relations dependent on the first signal symbol and the first bit position.

18. The device according to claim 17, wherein the storage means is adapted to store the number of functional relations in a look-up table indexed by the number of signal symbols and the bit positions.

19. The device according to claim 17, wherein the processing means is adapted to identify the first signal symbol by comparing the signal components of the received multilevel signal with predetermined threshold values.

20. The device according to claim 17, wherein the processing means is adapted to calculate the soft value as a log-likelihood ratio.

21. The device according to anyone to claim 17, wherein the processing means is further adapted to identify the first signal symbol as being closest to the received multilevel signal with respect to a Euclidean distances in a signal space.

22. The device according to claim 21, wherein the signal space is related to the complex plane in quadrature amplitude modulation.

23. The device according to claim 17, wherein the number of signal symbols are associated with the number of bit sequences such that the bit sequences associated with all nearest neighbours of each signal symbol only differ from the bit sequence of that signal symbol at one bit position.

24. The device according to claim 17, wherein the device further comprises a decoder adapted to receive an input signal from the arrangement indicative of the determined soft value.

25. The device according to claim 17, wherein the device is operable as a mobile terminal.

* * * * *

UNITED STATES PATENT AND TRADEMARK OFFICE
CERTIFICATE OF CORRECTION

PATENT NO. : 7,480,342 B2
APPLICATION NO. : 10/506913
DATED : January 20, 2009
INVENTOR(S) : Wilhelmsson et al.

It is certified that error appears in the above-identified patent and that said Letters Patent is hereby corrected as shown below:

On the Title Page, item (57), under "ABSTRACT", in Column 2, Line 6, delete "($S_8$, $S_6$)" and insert -- ($S_6$, $S_8$) --, therefor.

On the Title Page, Item (57), under "ABSTRACT", in Column 2, Line 10, delete "($\delta_1$ $\delta_2$)." and insert -- ($\delta_1$, $\delta_2$). --, therefor.

In Column 6, Line 2, delete "r," and insert -- r', --, therefor.

In Column 6, Line 37, delete "$r=gW^H h_r s+n$," and insert -- $r=gw^H h_r s+n$, --, therefor.

In Column 8, Line 17, delete "$\hat{s}_{1,m}$," and insert -- $\hat{s}_{i,m}$, --, therefor.

In Column 8, Line 44, delete "$\hat{s}_{1,m}$" and insert -- $\hat{s}_{i,m}$ --, therefor.

In Column 8, Line 46, delete "$d_{1,m}=|r-\hat{s}_{1,m}|$," and insert -- $d_{i,m}=|r-\hat{s}_{i,m}|$, --, therefor.

In Column 8, Line 48, delete "$A_{1,m}$," and insert -- $A_{i,m}$, --, therefor.

In Column 9, Line 56, delete "$\hat{S}=S_6$." and insert -- $\hat{s}=S_6$. --, therefor.

In Column 10, Line 22, delete " $\check{S}$ " and insert -- š --, therefor.

In Column 10, Line 23, delete "$S_i$... $S_M$," and insert -- $S_1$... $S_M$, --, therefor.

In Column 10, Line 25, delete " $\check{S}is$ " and insert -- š is --, therefor.

In Column 10, Line 27, delete " $\check{S}and$ " and insert -- š and --, therefor.

In Column 10, Line 28, delete "$\hat{S}which$" and insert -- $\hat{s}$ which --, therefor.

In Column 10, Line 28, delete " $\check{S}and$ " and insert -- š and --, therefor.

In Column 10, Line 30, delete "$\delta_3 is$" and insert -- $\delta_3$ is --, therefor.

In Column 10, Line 31, delete "$\hat{S}when$" and insert -- $\hat{s}$ when --, therefor.

In Column 10, Line 32, delete "m of $\hat{S}at$" and insert -- $\hat{s}_m$ of $\hat{s}$ at --, therefor.

UNITED STATES PATENT AND TRADEMARK OFFICE
CERTIFICATE OF CORRECTION

PATENT NO. : 7,480,342 B2
APPLICATION NO. : 10/506913
DATED : January 20, 2009
INVENTOR(S) : Wilhelmsson et al.

It is certified that error appears in the above-identified patent and that said Letters Patent is hereby corrected as shown below:

In Column 10, Line 34, delete "$(\delta_3)^2$" and insert -- $((\delta_3)^2$ --, therefor.

In Column 10, Line 38, delete " $\check{s}=S_8.$ " and insert -- $\check{s}=S_8.$ --, therefor.

In Column 10, Line 40, delete " $\check{s}_1=1.$ " and insert -- $\check{s}_1=1.$ --, therefor.

In Column 12, Line 27, delete "$S_9=31$ 3d-jd," and insert -- $S_9=$ -3d-jd, --, therefor.

In Column 16, Line 18, in Claim 21, after "according to" delete "anyone to".

Signed and Sealed this

Fourth Day of August, 2009

JOHN DOLL
*Acting Director of the United States Patent and Trademark Office*